United States Patent Office 3,378,657
Patented Apr. 16, 1968

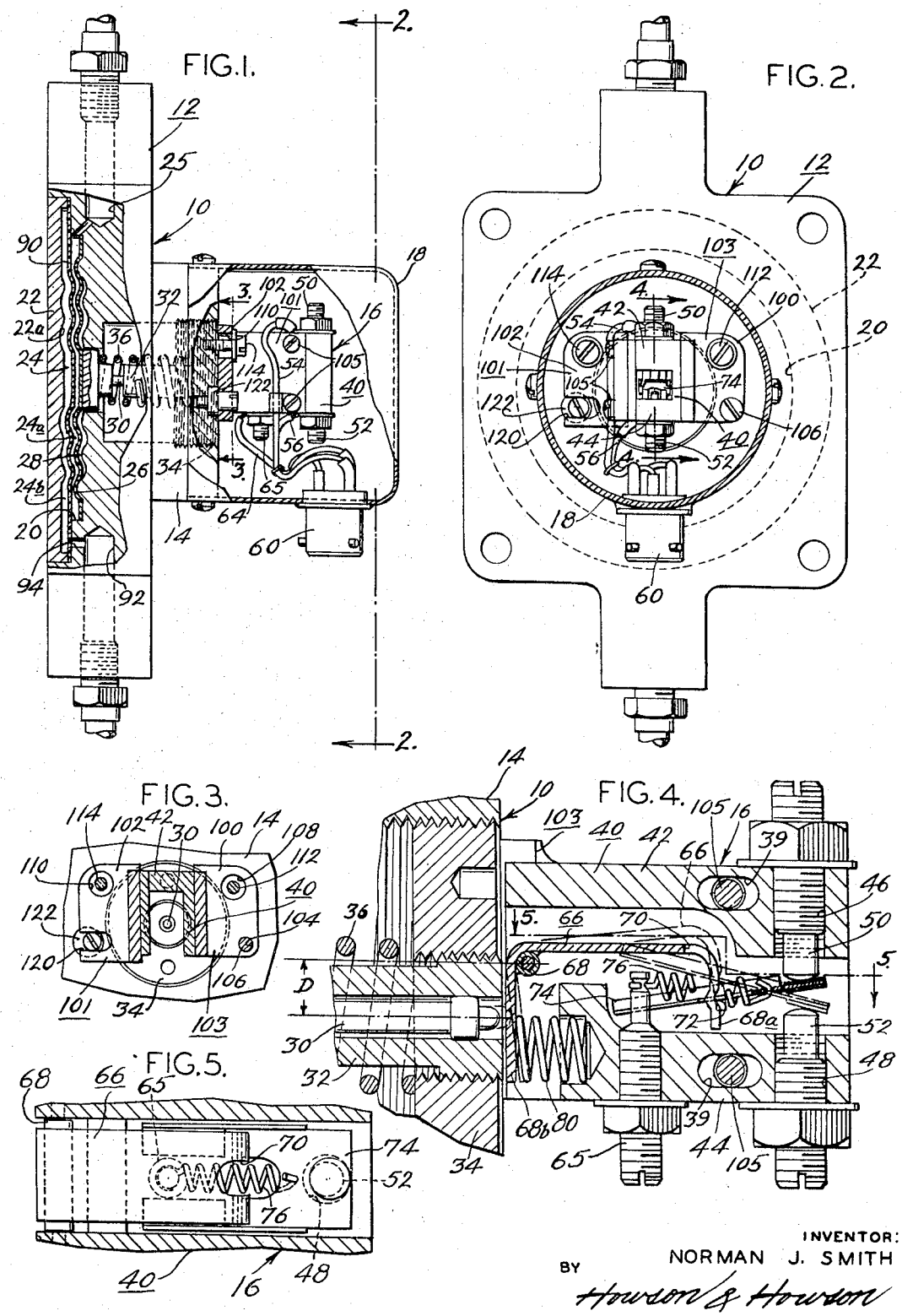

3,378,657
CALIBRATING PRESSURE SWITCH
Norman J. Smith, 2123 Middle Drive,
Slidell, La. 70458
Filed May 4, 1966, Ser. No. 547,643
9 Claims. (Cl. 200—83)

ABSTRACT OF THE DISCLOSURE

A pressure switch assembly comprising a body portion and a switch mechanism having a contact element operable between opposite limit positions. A diaphragm chamber is provided in the body portion which mounts therein a system diaphragm and a calibration diaphragm which are of generally the same configuration and having outer faces conforming to the inner and outer walls of the diaphragm chamber. The space between the inner faces of the diaphragms defines a first chamber section and the space between the outer face of one of the diaphragms and the outer wall of the diaphragm chamber defines a second chamber section. The body portion includes a system pressure port communicating with one of the chamber sections and a calibration pressure port communicating with the other chamber section. An actuator connected to one of the diaphragms and the contact element of the switch operates upon pressure change in the diaphragm sections to move said contact element between limit positions.

---

The present invention relates to pressure switches and more particularly to new and improved means for calibrating pressure switches.

The invention described herein was made in the performance of work under a NASA contract and is subject to the provisions of Section 305 of the National Aeronautics and Space Act of 1958, Public Law 85–568 (72 Stat. 435; 42 U.S.C. 2457).

The present invention relates to improved means for calibrating diaphragm-type pressure switches. Some of these switches comprise a base or body having a diaphragm chamber with a flexible diaphragm mounted therein responsive to pressure changes in the chamber, an actuator connected to the diaphragm and a switch mechanism actuatable by the actuator in response to movement of the actuator by deflection of the diaphragm. There are many instances where pressure switches of this type are employed and the necessary calibration thereof can only be carried out from a remote location. For example, in the pressure switches located or mounted on a launch vehicle or manned spacecraft are typically the type that must be calibrated from a remote location. Further, it is essential that reliable calibration techniques be employed especially in view of the fact that the complexity of these vehicles necessitates the use of automatic computer check out methods to expeditiously isolate any component problems on space vehicles at the lauch site or in space. Further in such applications the pressure switch calibration system must be capable of withstanding extreme temperature and shock conditions. Moreover, in these applications, it is desirable to minimize or eliminate all calibration components on the space or launch vehicle especially since the calibration is no longer necessary after ignition and flight begins. Pressure switches of the type to which the present invention relates are also used in refineries and petro-chemical plants where tank pressure switches can be remotely monitored and the monitor device calibration can be checked in the same manner described above in connection with launch vehicles.

Several presently known means are employed for calibrating switches of this type. For example, in some instances the switch is calibrated by uncoupling the system line and then attaching a calibration pressure source to the switch or by changing from system to calibration lines through the use of various types of valves, for example, hand valves, pressure operated valves or solenoid valves. It has been found, however, that this means of calibrating pressure switches is not entirely reliable, due, for example, to the possibility of sensing line contamination, the complexity of the system, the possibility of leakage in valve seats or connecting components and the failure of all of the components of the calibration system to meet environmental requirements.

In accordance with another means for calibrating pressure switches of this type, a separate pressure chamber communicating with a calibrating source of pressure is defined by a disc-like metal diaphragm which is spring biased on one side and mounts a push-rod on its opposite face which engages the operating diaphragm. By this arrangement, during calibration there is a unit loading of the operating diaphragm. It has been found that this arrangement does not allow a proper match of spring ratings so that the calibration operation cannot reproduce the effect of a uniformly distributed pressure on the operating diaphragm. Hence these arrangements have no provided accurate calibration results.

In accordance with the present invention, the calibration means for the switch comprises a second diaphragm termed a "calibration diaphragm" which is mounted in the diaphragm chamber in confronting relation to the working or pressure diaphrgam and which divides the diaphragm chamber into inner and outer sections. The diaphragms are adapted to be operated by two separate sources without a change in the pressure switch setting. One source is the normal operating pressure communicating with the inner section of the diaphragm chamber between the calibration and actuating diaphragms and the other is a separate calibration source adapted to communicate with the outer section of the diaphragm chamber through a port in the body portion of the switch. In the illustrated embodiment of the invention, both the calibration diaphragm and the working diaphragm are of a corrugated configuration comprising a plurality of circumferentially extending convolutions. However, if desired, in some applications, flat disc-like diaphragms may be employed. Additionally the front and back walls defining the diaphragm chamber are of a matching configuration conforming to the shape of the diaphragms so that during normal operation of the switch the calibration diaphragms bears against a wall having the same configuration as the diaphragm. Moreover, the matching configuration of the wall confronting the working diaphragm in combination with a stop member provides over pressure protection means for the working diaphragm. By this arrangement, when it is desired to calibrate the switch, pressure is applied through the port to the outer diaphragm chamber whereby the calibrating diaphragm and the actuating diaphragm, which are in confronting relation, are displaced to effect normal actuation of the switch. It is noted that the calibration diaphragm takes the shape of the actuating diaphragm and provides equally distributed pressure over the entire surface thereof, equivalent almost exactly to the effect of the normal working pressure to provide a very accurate calibration of the switch. During normal operation of the switch, that is, when the pressure port is open, the calibration diaphragm is pressed against the back wall of the housing.

The calibration means of the present invention provides a number of advantages over the prior methods heretofore used. For example, in the calibration system of the present invention leakage is minimized, the only possible leakage path being past the calibration diaphragm. This contrasts with previous methods discussed above where several leakage paths were possible, for example, at the various valve connections and past the valve seats. Moreover in the present arrangement no additional electrical leads or power means is required, as contrasted with previous systems for utilizing solenoid valves. The calibration diaphragm is a simple addition to the switch which is economical and makes the assembly thereof comparatively simple as compared with the prior methods utilizing separate valves, brackets, and tubing. Further, clearly the cost of adding a simple diaphragm to the switch is much less than the cost of the various extra items required for prior systems described above. As noted above, the calibration means of the present invention is much more reliable and provides a much higher reliability in calibrating the switch.

The above-cited objects and other objects of the present invention are hereinafter more fully set forth and described with reference to the accompanying drawings, wherein:

FIG. 1 is a side elevational view partly in section of a diaphragm actuated switch incorporating the calibration means and sensitivity adjustment of the present invention;

FIG. 2 is a sectional view of the switch taken on lines 2—2 of FIG. 1;

FIG. 3 is an enlarged sectional view of the adjustable sensitivity feature of the present invention taken on line 3—3 of FIG. 1;

FIG. 4 is an enlarged sectional view of the switch actuator taken on line 4—4 of FIG. 2; and FIG. 5 is an enlarged view of a portion of the switch actuator taken on line 5—5 of FIG. 4.

Referring now to the drawings and particularly to FIGS. 1 and 2 thereof, there is illustrated a pressure switch assembly generally designated by the numeral 10 incorporating calibration means and sensitivity adjusting means in accordance with the present invention. The switch assembly comprises a base or body portion 12 having a short, generally cylindrical portion 14 projecting from one face of the base and a switch mechanism 16 mounted on the projecting portion 14 and enclosed by a cup-like cover 18.

The base or body portion has a circular recess 20 in its back face covered by a back plate 22 defining a diaphragm chamber 24 and a port 25 communicating with the diaphragm chamber to sense the system pressure. A disc-like flexible system or working diaphragm 26 is mounted across the diaphragm chamber 24 having, in the present instance, a corrugated configuration comprised of a plurality of circumferentially extending, radially spaced convolutions which conform to the undulating inner wall 28 of the diaphragm chamber. The working diaphragm 26 mounts an actuator in the form of a plunger rod 30 at its central portion which in turn is housed in a generally cylindrical hollow tubular member 32. The tubular member 32 is threaded at its outer end so that it may be mounted centrally of an adjustable threaded nut 34 which in turn is mounted in the outer end of the extension 14. The nut 34 is movable axially for selectively adjusting the range of a main range spring 36 normally biasing the plunger and diaphragm rearwardly with respect to FIG. 1 in a direction away from the switch mechanism.

The switch mechanism 16, which in the present instance is a snap-action, single-pole, double-throw switch, comprises a support structure 40 including a pair of spaced apart upper and lower wall segments 42 and 44 which adjacent their outer terminal ends have a pair of aligned threaded openings 46 and 48 respectively for mounting a pair of contacts 50 and 52. Electrical leads 54 and 56 connect the low pressure contact 50 and high pressure contact 52 respectively to an outlet receptacle 60 mounted on the cover 18. The common lead 64 from the receptacle 60 connects to a screw element 65 mounted in the lower wall of the support structure as illustrated in FIG. 4. The switch mechanism further includes an actuator lever 66 of generally L-shaped configuration pivotally mounted between the sidewalls of the support structure 40 as at 68, the L-shaped actuator lever 66 having an outer leg extension 68a with a central slot 70 therein and an indented portion 72 to pivotally support a contact arm 74. This contact arm 74 is supported in the recessed pivot indentures 72 by means of a tension spring 76 connected at one end to the outer end of the contact arm and at its inner end to the screw member 65. By this arrangement, when the actuator lever 66 is in its normal position (full line position shown in FIG. 4), the contact arm 74 engages the low pressure contact 50, a compression spring 80 normally biasing the actuator lever 66 to this position. Now when the lever 66 is pivoted about the point 68 against the bias of the spring 80 in a counterclockwise direction, the contact arm 74 is pivoted by the over-center pivot arrangement of the contact arm to the actuator lever 66 to the position shown in broken lines in FIG. 4 to engage the high pressure contact 52.

Consider now briefly the normal operation of the pressure switch with the system port 25 open to sense pressure in a system. With the pressure in the diaphragm chamber 24 at a predetermined level, the main range spring 36 biases the switch actuator plunger 30 inwardly toward the diaphragm chamber and compression spring 80 biases lever 66 inwardly in engagement with plunger 30 whereby the switch contact arm 74 is normally biased to engage the low pressure contact 50 Pressure build up in the diaphragm chamber 24 to a value higher than a predetermined value moves the system diaphragm 26 to the right with respect to FIG. 1 against the bias of the main range spring 36 and compression spring 80 whereby the plunger rod 30 moves the multiplying lever 66 to pivot it about the pivot 68 and effect snap action movement of the contact arm 74 to engage the high pressure contact 52.

In accordance with the present invention, means is provided for calibrating the diaphragm type pressure switch described above. This means comprises, as best illustrated in FIG. 1, a second calibration diaphragm 90 which may be a resilient material, preferably of low spring rating such as polytetrafluoroethylene (sold under the trade name "Teflon" by the E. I. du Pont de Nemours Company). It is noted that the diaphragms may be made of other suitable materials, for example a thin metallic foil. This calibration diaphragm 90 which extends across the diaphragm chamber 24 and divides the chamber 25 into inner and outer sections 24a and 24b is also of an undulating or corrugated configuration having a plurality of circumferentially spaced convolutions to closely conform to the system diaphragm 26 which it overlies and confronts. A calibration port 92 is provided in the base having a short, axially extending connecting passage 94 communicating with the outer section 24b of the diaphragm chamber, the system port 25 communicating with the space between the diaphragms defining the inner section 24a of the diaphragm chamber. Now when it is desired to calibrate the switch, suitable controlled pressure is simply applied through the calibration port 92 to the outer section 24b of the diaphragm chamber.

By this arrangement, in the normal operation of the pressure switch 12 when there is a pressure build up in the system, the pressure build up is reflected in the inner section 24a of the diaphragm chamber whereby the calibration diaphragm 90 is displaced rearwardly against the back plate 22 and the system diaphragm 26 is displaced forwardly into engagement with the inner wall of the diaphragm chamber. The inner wall 22a of the back plate 20 is of a matching configuration comprising in the present instance a plurality of radially spaced convolutions and a central disc-like section 22b to provide a seat for the diaphragm when the calibration diaphragm is displaced during calibration or normal operation of the switch. Displacement of the system diaphragm 26 moves the plunger rod 30 outwardly against the bias of the main range spring 36 and compression spring 80 to pivot the lever 66 about the point 68 and effect snap-action pivotal movement of the contact arm from its normal position engaging the low pressure contact 50 (solid lines in FIG. 4) to a position engaging the high pressure contact 52 (broken lines in FIG. 4). It is noted that the matching configuration of the wall 28 and the system diaphragm 26 in combination with the stop provided by the tubular member 32 provide an over pressure protection means for the system diaphragm. Of course, when the system pressure decreases, the main range spring 36 retracts the plunger rod 30 and the compression spring 80 pivots the actuator lever 66 in a clockwise direction about the pivot 68 to return the contact arm 74 to its normal position engaging the low pressure contact 50.

When it is desired or necessary to make a calibration check of the switch from a remote location, a predetermined calibrating pressure is applied through the port 92 which is sensed in the outer section 24a of the diaphragm chamber. This calibration pressure displaces the calibration diaphragm 90 to a position engaging and overlying the system diaphragm 26 thereby to displace the plunger rod 30 to actuate the lever 66 and contact arm in the manner described above. It is noted that since the calibration diaphragm takes the shape of the system diaphragm, there is provided a uniformly distributed pressure over the entire surface thereof equivalent to the effect of the normal system pressure to provide for a very accurate calibration check of the switch. Furthermore, since there are no mechanical elements between the diaphragm, which would provide unit loading of the system diaphragm, the chance of error in the calibration due to unit loading is eliminated.

Another feature of the present invention is the provision of means for selectively adjusting the contact pressure of the contact arm on the high and low pressure contacts. In the present instance this is accomplished by selectively adjusting screw 65 inwardly or outwardly. For example, assume that screw 65 has been adjusted to a "center" position to provide equal contact pressure of contact arm 74 on the high and low pressure contacts 50 and 52. Now if the screw 65 is threaded downwardly relative to FIG. 4, the contact pressure of the arm 74 will be greater on the contact 52 than on the contact 50 and if screw 65 is threaded upwardly in the opposite direction, the pressure relationship is reversed.

Another feature of the present invention is the provision of means for insuring actuation of the switch assembly within prescribed pressure limits. For example, it has been found that due to manufacturing tolerances in various moving parts such as diaphragms 26 and 90 and range spring 36, the stroke output of plunger 30 does not always effect actuation of the switch within prescribed actuation and deactuation limits. To this end, variable multiplying means is provided for selectively varying the effective stroke of the plunger 30. In the present instance this is accomplished by providing means for selectively varying the distance D between the contact point of the plunger rod 30 on the leg 66a of the lever 66 and the pivot point 68 of the lever 66, or in effect varying the ratio of the fixed long leg of lever 66 to its short leg. In the present instance this is accomplished by mounting the support structure 40 for the switch assembly in a manner permitting limited pivotal movement thereof relative to the base or body of the switch. To this end, the support structure 40 is supported between mounting brackets 101 and 103 having outwardly directed flanges 100 and 102. The support structure 40, as best illustrated in FIG. 4, has slotted openings 39 to receive screws 105 so that the support structure 40 may be secured in a selected position on the brackets 101 and 103.

In the present instance the flange 100 is provided with a hole 104 in one corner thereof to receive a pivot screw 106 which fixes the support structure for pivotal movement about the screw 106. The opposite corner of the flange 100 has an enlarged opening 108 and the opposed corner of the flange 102 has an enlarged opening 110 to receive fastening screws 112 and 114 to hold the support structure tightly in place for a given positioning thereof. The lower corner of the flange 102 is provided with a slotted opening 120 and mounted in the slot 120 is an eccentric element 122 which is rotatable to effect pivotal movement of the support assembly about the pivot 106. Now when it is desired to pivot the entire support structure about its pivot 106, the eccentric element 122 is simply rotated through the range shown in FIG. 3. Pivotal movement of the support structure varies the distance D between the contact point of the plunger with the leg 68b of the lever 66 and the pivotal axis of the lever 66 and in this manner provides a means for selectively changing the effective stroke of the output plunger thereby insuring actuation of the switch within prescribed pressure limits.

In order to better understand the feature of the present invention described above, the following is a brief description of the assembly of the switch. Assuming that the working system diaphragm 26, the calibration diaphragm 90 and the back plate 22 have been properly assembled to the base or body 12, the next step is to position the plunger 30 in place and then the helical range spring 36.

The large nut 34 together with tubular guide 32 are screwed loosely down in place against the range spring 36. The end of the plunger 30 is approximately flush with the front face of the extension 14 at this stage. A standard dial indicator (test equipment) is placed over the end of the plunger 30 and set at zero. Pressure is applied at either the calibration port 92 or system port 25, usually the latter, and the large nut 34 is screwed down several turns leaving guide 32 in a loose upper position. The effect of screwing down the large nut 34 is to provide an initial load to suppress motion of the plunger 30 in the lower part of the pressure range. By such means, lower than normal or lighter than normal spring rates in both the system diaphragm and the helical range spring can be tolerated so that a larger than normal stroke is available in the differential working range of the pressure switch with resultant ability for a narrower working differential.

After the stroke setting is considered satisfactory, the guide member 32, is screwed down until it is .002" or .003" above the maximum stroke position. This can be easily seen by watching the dial indicator to see that normal stroke is not restricted.

The next step is to assemble the snap switch unit to the body or base assembly commonly known as pressure sensor of the assembly. As illustrated in FIG. 4, slots 39 in the insulating body of the switch unit permit required forward or rearward adjustment of the switch unit relative to the sensor. The specified actuation pressure is applied to the switch and by loosening the two fastening screws, the switch unit is moved inwardly until contact actuation takes place. The pressure is then reduced and deactuation pressure is noted. If the differential is too large (or too small) the eccentric slope adjustment screw 122 is turned to either increased or decrease the effective stroke required. This changes the short radius of the L lever in the snap switch unit to shorten or lengthen it accordingly and the desired width of differential can be obtained. If a further vernier adjustment of differential is still required, screws 46 and 48 can be adjusted to increase or decrease the contact gap. Although screw 65 should be positioned at subassembly of the snap switch unit to center the action of the tension spring 76 to provide equal contact pressure on the high and low contacts, nevertheless as noted above, it can be adjusted to vary pressure on contacts.

While particular embodiments of the present invention have been illustrated and described herein, it is not intended to limit the invention and changes and modifications may be made herein within the scope of the following claims.

I claim:
1. A pressure switch assembly comprising a body portion and a switch mechanism having a contact element operable between opposite limit positions, means defining a diaphragm chamber in said body portion having confronting spaced-apart inner and outer walls, a system diaphragm and a calibration diaphragm mounted in said chamber in spaced-apart relation, one face of said system diaphragm confronting and adapted to engage the inner wall of said diaphragm chamber and one face of said calibration diaphragm confronting and adapted to engage the outer wall of said diaphragm chamber, the space between the inner confronting faces of the diaphragms defining a first chamber section and the space between the outer face of one of he diaphragms and said outer wall of said diaphragm chamber defining a second chamber section, means defining a system pressure port in said body portion communicating with one of said chamber sections, means defining a calibration pressure port in said body portion communicating with the other of said chamber sections and actuator means connected to one of said diaphragms and to said contact element of the switch mechanism operable upon a pressure change in said diaphragm chamber sections to effect said contact element between limit positions, the diaphragm faces being of conforming configuration to one another and to the walls of said diaphragm chamber thereby to provide a uniformly distributed pressure upon pressurization of said diaphragm chamber sections.

2. A pressure switch assembly as claimed in claim 1 wherein each of said diaphragms is of disc-like form and is of a corrugated configuration comprising a plurality of circumferentially extending radially spaced convolutions whereby the pressure buildup in said second chamber section displaces the diaphragms into pressure-applying relation and wherein the walls of said chamber confronting the outer faces of said diaphragms are of a corrugated configuration comprising a plurality of circumferentially extending radially spaced convolutions conforming to the configuration of the diaphragms.

3. A pressure switch assembly as claimed in claim 1 wherein said switch mechanism includes a pair of contacts, a pivotally mounted actuator lever, a contact arm connected to said lever and operable upon actuation of said lever to engage either of said contacts pressure buildup in said chamber sections operable to effect displacement of said system diaphragm to move said actuator means to engage said lever and pivot the same to effect movement of said contact arm.

4. A pressure switch assembly as claimed in claim 3 including contact pressure adjusting means operatively associated with said contact arm for selectively varying contact pressure of said contact arm on said contacts.

5. A pressure switch assembly as claimed in claim 3 wherein said actuator means comprises a plunger rod connected to the system diaphragm, a tubular member mounted in an opening in said body portion in which the plunger is guided and spring biasing means normally urging said plunger rearwardly in said tubular member.

6. A pressure switch mechanism including an actuator lever pivotally mounted intermediate its ends and a contact arm pivotally connected to said lever at one end, said contact arm being operable upon actuation of said lever to move said contact arm between opposite limit positions, pressure sensing means including an actuator adapted to engage said lever at its other end to effect pivotal movement thereof in response to pressure changes in said pressure sensing means, and variable multiplying means for selectively varying the point of engagement of said actuator means on said actuator lever whereby the switch mechanism is actuated within predetermined pressure limits.

7. A pressure switch assembly as claimed in claim 6 including a support structure in which the switch mechanism is mounted and means mounting said support structure to said sensor for pivotal movement relative thereto.

8. A pressure switch assembly as claimed in claim 6 wherein said pressure sensing means includes a body portion, a diaphragm chamber in said body portion and a diaphragm mounted in said chamber responsive to pressure changes and connected to said actuator and wherein said switch mechanism is carried by a support structure mounted on said body portion and adapted for adjusting pivotal movement relative thereto.

9. A pressure switch mechanism as claimed in claim 8 including biasing means normally pivoting said lever toward said actuator.

References Cited
UNITED STATES PATENTS

| | | | |
|---|---|---|---|
| 2,582,483 | 1/1952 | Hallerberg | 200—83 |
| 2,741,678 | 4/1956 | Schaefer et al. | 200—83 |
| 3,200,215 | 8/1965 | Good | 200—83 |

BERNARD A. GILHEANY, *Primary Examiner.*

H. B. GILSON, *Assistant Examiner.*